United States Patent (12)
Watanabe et al.

(10) Patent No.: US 7,200,411 B2
(45) Date of Patent: Apr. 3, 2007

(54) PORTABLE INFORMATION TERMINAL AND COMMUNICATION SYSTEM

(75) Inventors: Hironobu Watanabe, Kanazawa (JP); Hiroki Ota, Fuchu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 23 days.

(21) Appl. No.: 10/543,704

(22) PCT Filed: Jan. 28, 2004

(86) PCT No.: PCT/JP2004/000783

§ 371 (c)(1),
(2), (4) Date: Jul. 27, 2005

(87) PCT Pub. No.: WO2004/068826

PCT Pub. Date: Aug. 12, 2004

(65) Prior Publication Data

US 2006/0058036 A1 Mar. 16, 2006

(30) Foreign Application Priority Data

Jan. 30, 2003 (JP) ............................. 2003-021915

(51) Int. Cl.
*H04Q 7/20* (2006.01)
(52) U.S. Cl. ............................. 455/456.4; 455/456.1; 455/456.2; 455/456.5; 455/456.6; 455/414.1
(58) Field of Classification Search .. 455/456.1–456.6, 455/404.2, 414.1–414.3, 418–420
See application file for complete search history.

(56) References Cited

U.S. PATENT DOCUMENTS 6,011,973 A * 1/2000 Valentine et al. ........ 455/456.6

(Continued)

FOREIGN PATENT DOCUMENTS

EP 1 162 853 A 12/2001

(Continued)

OTHER PUBLICATIONS

Supplementary European Search Report for Application No. EP 04 70 5920, dated Mar. 20, 2006.

(Continued)

*Primary Examiner*—Edan Orgad
*Assistant Examiner*—RuiMeng Hu
(74) *Attorney, Agent, or Firm*—RatnerPrestia

(57) ABSTRACT

Herein disclosed are a portable information terminal and a communication system according to the present invention. The portable information terminal comprises an information providing unit 109 for providing information in accordance with a providing method which the information providing unit 109 is set to, a providing pattern data storage unit 104 for storing therein pattern data associating each of the providing methods with a location and a moving speed, a sensor unit 102 for detecting a current location and a moving speed, and a providing method control unit 106 for obtaining the providing method associated with the current location and the moving speed from the providing pattern data storage unit 104 and controlling an output port 108 to change the providing method previously set to the information providing unit 109 to have the information provided in accordance with the providing method indicated by the obtained pattern data.

8 Claims, 8 Drawing Sheets

U.S. PATENT DOCUMENTS

| | | | |
|---|---|---|---|
| 6,108,532 A | 8/2000 | Matsuda et al. | |
| 6,496,703 B1* | 12/2002 | da Silva | 455/456.4 |
| 6,496,709 B2* | 12/2002 | Murray | 455/569.1 |
| 6,937,868 B2* | 8/2005 | Himmel et al. | 455/456.4 |
| 6,973,333 B1* | 12/2005 | O'Neil | 455/569.2 |
| 6,999,757 B2* | 2/2006 | Bates et al. | 455/417 |
| 2001/0044312 A1* | 11/2001 | Yamane | 455/456 |
| 2003/0008644 A1* | 1/2003 | Akhterzzaman et al. | 455/418 |

FOREIGN PATENT DOCUMENTS

| | | |
|---|---|---|
| JP | 2001-189797 | 7/2001 |
| JP | 202-118625 | 4/2002 |
| JP | 2002-315056 | 10/2002 |
| JP | 2003-264875 | 9/2003 |
| WO | WO 02/071638 A | 9/2002 |

OTHER PUBLICATIONS

International Search Report corresponding to application No. PCT/JP2004/000783 dated Apr. 20, 2004.

* cited by examiner

FIG.4

| Location / Speed | On Railway | On Road | In Building |
|---|---|---|---|
| Under 5km/h | Visual+Tactual | Visual | Acoustic+Tactual |
| Over 5km/h | Acoustic+Tactual | Tactual | Tactual |

PORTABLE INFORMATION TERMINAL AND COMMUNICATION SYSTEM

This application is a U.S. National phase Application of PCT International Application PCT/JP2004/000783.

1. Technical Field of Invention

The present invention relates to a communication system for providing information in accordance with an information providing method selected from among a plurality of information providing methods, and more particularly to a portable information terminal capable of providing information in accordance with an information providing method appropriate to a location and a moving speed thereof.

2. Background Art

Up until now, there have been provided a wide variety of portable information terminals each designed to change its method of providing information, hereinlater simply referred to as "information providing method", without being manually switched or turned off by an operator especially at a place such as, for example, a train or a movie theater where the use of the portable information terminal is undesirable. One typical example of the portable information terminal is disclosed in, for example, Japanese Patent Laid-Open Publication 2001-189797.

The portable information terminal herein used is intended to mean a portable information appliance including an electronics device such as, for example, a portable cellular phone, a portable audio device, a digital still camera, a gaming device, a notebook computer, a vehicle navigation device, a car audio device, and the like, and adapted to provide information to an operator in accordance with one of a plurality of information providing methods including an acoustic method having information provided by way of an acoustic message, a visual method having the information provided by way of a visual message such as for example characters, graphics, luminescence, or the like, and a tactual method having the information provided by way of vibration.

The conventional communication system is shown in FIG. 8 as comprising a sensor 1 equipped with direction detecting means 2 for detecting a moving direction of the portable information terminal, signal generating means 3 for generating a control signal, and signal transmitting means 4 for transmitting the control signal, and a portable information terminal 5 equipped with signal receiving means 6 for receiving the control signal from the sensor 1, signal detecting means 7 for detecting the control signal thus received, communications control means 8 for controlling transmitting and receiving operations of the portable information terminal 5, and an additional sensor, not shown, for judging whether or not the portable information terminal 5 is moving. The sensor 1 is installed at a doorway of an area where it is desirable to limit the transmitting and receiving operations of the portable information terminal 5, and operative to control the portable information terminal 5 to have the portable information terminal 5 switch a ring alert mode to a vibration mode and vice versa, change its ring volume or the number of vibration frequency.

The present invention is directed to an improvement over the conventional communication system, and it is an object of the present invention to provide a portable information terminal and a communication system capable of changing its information providing method in response to a location and an environment where the portable information terminal is carried and operated without being manually switched or turned off by the operator.

DISCLOSURE OF THE INVENTION

In accordance with a first aspect of the present invention, there is provided a portable information terminal, comprising: information providing means operable to be set to a providing method in advance selected from among a plurality of providing methods including an acoustic method having the information provided by way of an acoustic message, a visual method having the information provided by way of a visual message, and a tactual method having the information provided by way of vibration, to provide information in accordance with the providing method set thereto; storage means for storing therein a data table associating each of the providing methods with a location and a moving speed; location detecting means for detecting a location; moving speed calculating means for calculating a moving speed at the location detected by the location detecting means; obtaining means for obtaining the providing method associated with the location detected by the location detecting means and the moving speed calculated by the moving speed calculating means with reference to the data table stored in the storage means; and providing method changing means for changing the providing method previously set to the information providing means to have the information provided in accordance with the providing method obtained by the obtaining means.

The portable information terminal thus constructed as previously mentioned can appropriately judge means by which an operator is moving, obtain a providing method associated with the location and the moving speed on the basis of the result of the judgment, and change the current providing method to the thus obtained providing method although the operator carrying the portable information terminal is moving.

Here, the visual method is intended to mean a providing method having information provided by way of a visual message such as for example characters, graphics, luminescence, and the like.

In accordance with a second aspect of the present invention, the aforementioned portable information terminal further comprises date and time information managing means for managing date and time information indicative of a date and a time, and in which the storage means is operative to store therein a data table associating each of the providing methods with a location, a moving speed, and a date and a time, and the obtaining means is operative to obtain the providing method associated with the location detected by the location detecting means, the moving speed calculated by the moving speed calculating means, and the date and the time managed by the date and time information managing means with reference to the data table stored in the storage means.

The portable information terminal thus constructed as previously mentioned can obtain a providing method associated with the location, the moving speed, and the current date and time, and change the current providing method to the thus obtained providing method although the portable information terminal is used in an environment where the providing method is required to be changed depending on the date and time.

In accordance with a third aspect of the present invention, in the aforementioned portable information terminal, the storage means is operative to store therein a data table associating each of the providing methods with a moving speed at a plurality of locations.

The portable information terminal thus constructed as previously mentioned can appropriately judge means by which an operator is moving, obtain a providing method associated with the location and the moving speed on the basis of the result of the judgment, and change the current providing method to the thus obtained providing method although the operator carrying the portable information terminal is moving.

In accordance with a fourth aspect of the present invention, the aforementioned portable information terminal further comprises: date and time information managing means for managing date and time information indicative of a date and a time, and in which the storage means is operative to store therein a data table associating each of the providing methods with a moving speed and a date and a time at a plurality of locations, the obtaining means is operative to obtain the providing method associated with the location detected by the location detecting means, the moving speed calculated by the moving speed calculating means, and the date and the time managed by the date and time information managing means with reference to the data table stored in the storage means.

The portable information terminal thus constructed as previously mentioned can obtain a providing method associated with the location, the moving speed, and the current date and time, and change the current providing method to the thus obtained providing method although the portable information terminal is used in an environment where the providing method is required to be changed depending on the date and time.

In accordance with a fifth aspect of the present invention, there is provided a communication system comprising: a portable information terminal, including: information providing means operable to be set to a providing method in advance selected from among a plurality of providing methods including an acoustic method having the information provided by way of an acoustic message, a visual method having the information provided by way of a visual message, and a tactual method having the information provided by way of vibration, to provide information in accordance with the providing method set thereto; location detecting means for detecting a location; moving speed calculating means for calculating a moving speed at the location detected by the location detecting means; obtaining means for obtaining the providing method associated with the location detected by the location detecting means and the moving speed calculated by the moving speed calculating means through a network; and providing method changing means for changing the providing method previously set to the information providing means to have the information provided in accordance with the providing method obtained by the obtaining means, and a server having stored therein a data table associating each of the providing methods with a location and a moving speed, and the server being operative to obtain the providing method associated with the location detected by the location detecting means of the portable information terminal and the moving speed calculated by the moving speed calculating means of portable information terminal with reference to the data table stored therein, and transmit the providing method thus obtained to the portable information terminal through the network.

The communication system thus constructed as previously mentioned makes it possible for the portable information terminal to obtain a providing method associated with the location and the moving speed, and change the current providing method to the thus obtained providing method because of the fact that the portable information terminal is operative to obtain the providing method from the server.

In accordance with a sixth aspect of the present invention, in the aforementioned communication system, the portable information terminal further includes: date and time information managing means for managing date and time information indicative of a date and a time, and the server has stored therein a data table associating each of the providing methods with a location, a moving speed, and a date and a time, and the obtaining means of the portable information terminal is operative to obtain the providing method associated with the location detected by the location detecting means, the moving speed calculated by the moving speed calculating means, and the date and the time managed by the date and time information managing means through the network from the server.

The communication system thus constructed as previously mentioned makes it possible for the portable information terminal to obtain a providing method associated with the location, the moving speed, and the current date and time, and change the current providing method to the thus obtained providing method although the portable information terminal is used in an environment where the providing method is required to be changed depending on the date and time because of the fact that the portable information terminal is operative to obtain the providing method from the server.

In accordance with a seventh aspect of the present invention, there is provided a communication system comprising: a portable information terminal, including: information providing means operable to be set to a providing method in advance selected from among a plurality of providing methods including an acoustic method having the information provided by way of an acoustic message, a visual method having the information provided by way of a visual message, and a tactual method having the information provided by way of vibration, to provide information in accordance with the providing method set thereto; storage means for storing therein a data table of a predetermined area associating each of the providing methods with a moving speed at a plurality of locations respectively located within the area; location detecting means for detecting a location; moving speed calculating means for calculating a moving speed at the location detected by the location detecting means; obtaining means for judging whether or not the location detected by the location detecting means is located within the area and contained in the data table of the area, and obtaining the providing method associated with the location detected by the location detecting means and the moving speed calculated by the moving speed calculating means with reference to the data table of the area stored in the storage means; providing method changing means for changing the providing method previously set to the information providing means to have the information provided in accordance with the providing method obtained by the obtaining means; and first communication means for transmitting location information indicative of the location detected by the location detecting means through a network when it is judged by the obtaining means that the location detected by the location detecting means is not contained in the data table of the area, and a server including: managing means for managing a plurality of data tables of a plurality of areas; selecting means for selecting an data table of an area from among the plurality of data tables of the plurality of areas managed by the managing means in response to the location information transmitted by the first communication means; and second communication means for transmitting the data table of the selected area in response to the location information to the portable information terminal, and the first communication means being operative to receive the data table of the selected area from the server through the network, and storage means being operative to modify the data table of the predetermined area stored therein in response to the data table of the selected area thus received.

The communication system thus constructed as previously mentioned makes it possible for the portable information terminal to obtain a providing method associated with the location and the moving speed from the data table of an area, and change the current providing method to the thus obtained providing method because of the fact that the portable information terminal is operative to obtain the data table of the area from the server. Further, the portable information terminal can update the therein stored data table of the area in response to a location of the portable information terminal In accordance with an eight aspect of the present invention, in the aforementioned communication system, the portable information terminal further includes: date and time information managing means for managing date and time information indicative of a current date and a current time, the storage means of the portable information terminal having stored therein a data table associating each of the providing methods with a moving speed, and a date and a time at a plurality of locations, the obtaining means of the portable information terminal is operative to obtain the providing method associated with the location detected by the location detecting means, the moving speed calculated by the moving speed calculating means, and the date and the time managed by the date and time information managing means with reference to the data table stored in the storage means.

The communication system thus constructed as previously mentioned makes it possible for the portable information terminal to obtain a providing method associated with the location, the moving speed, and the date and time from the data table of an area, and change the current providing method to the thus obtained providing method because of the fact that the portable information terminal is operative to obtain the data table of the area from the server. Further, the portable information terminal can update the therein stored data table of the area in response to a location of the portable information terminal In accordance with a ninth aspect of the present invention, in the aforementioned communication system, the portable information terminal further includes timing means for obtaining a time at a predetermined time cycle, the obtaining means of the portable information terminal is operative to obtain the providing method associated with the location detected by the location detecting means and the moving speed calculated by the moving speed calculating means through the network from the server at the predetermined time cycle.

The communication system thus constructed as previously mentioned makes it possible for the portable information terminal to update the providing method at a predetermined time cycle because of the fact that the portable information terminal is operative to obtain the data table of the area from the server at the predetermined time cycle.

In accordance with a tenth aspect of the present invention, in the aforementioned communication system, the portable information terminal further includes timing means for obtaining a time at a predetermined time cycle, and the obtaining means of the portable information terminal is operative to obtain the providing method associated with the location detected by the location detecting means, the moving speed calculated by the moving speed calculating means, and the date and the time managed by the date and time information managing means through the network from the server at the predetermined time cycle.

The communication system thus constructed as previously mentioned makes it possible for the portable information terminal to update the providing method at a predetermined time cycle because of the fact that the portable information terminal is operative to obtain the data table of the area from the server at the predetermined time cycle.

In accordance with an eleventh aspect of the present invention, in the aforementioned communication system, the portable information terminal further includes timing means for obtaining a time at a predetermined time cycle, the obtaining means of the portable information terminal is operative to obtain the data table of the area corresponding to the location detected by the location detecting means and the moving speed calculated by the moving speed calculating means through the network from the server at the predetermined time cycle.

The communication system thus constructed as previously mentioned makes it possible for the portable information terminal to update the data table of the area stored in the storage means at a predetermined time cycle because of the fact that the portable information terminal is operative to obtain the data table of the area from the server at the predetermined time cycle.

In accordance with a twelfth aspect of the present invention, in the aforementioned communication system, the portable information terminal further includes timing means for obtaining a time at a predetermined time cycle, and the obtaining means of the portable information terminal is operative to obtain the data table of the area corresponding to the location detected by the location detecting means, the moving speed calculated by the moving speed calculating means, and the date and the time managed by the date and time information managing means through the network from the server at the predetermined time cycle.

The communication system thus constructed as previously mentioned makes it possible for the portable information terminal to update the data table of the area stored in the storage means at a predetermined time cycle because of the fact that the portable information terminal is operative to obtain the data table of the area from the server at the predetermined time cycle.

In accordance with a thirteenth aspect of the present invention, in the aforementioned communication system, the information providing means of the portable information terminal has an expiration date of the selected providing method, the obtaining means of the portable information terminal is operative to judge whether or not the expiration date of the selected providing method is past, and the obtaining means of the portable information terminal is operative to obtain the providing method associated with the location detected by the location detecting means and the moving speed calculated by the moving speed calculating means through the network from the server when it is judged that the expiration date of the selected providing method is past.

The communication system thus constructed as previously mentioned makes it possible for the portable information terminal to obtain a providing method associated with the location and the moving speed from the server in the case that the expiration date of the providing method, to which the information providing means is set, is past.

In accordance with a fourteenth aspect of the present invention, in the aforementioned communication system, the information providing means of the portable information terminal has an expiration date of the selected providing method, the obtaining means of the portable information terminal is operative to judge whether or not the expiration date of the selected providing method is past, and the obtaining means of the portable information terminal is operative to the location detected by the location detecting means, the moving speed calculated by the moving speed calculating means, and the date and the time managed by the date and time information managing means through the network from the server when it is judged that the expiration date of the selected providing method is past.

The communication system thus constructed as previously mentioned makes it possible for the portable information terminal to obtain a providing method associated with the location, the moving speed, and the date and time from the server in the case that the expiration date of the providing method, to which the information providing means is set, is past.

In accordance with a fifteenth aspect of the present invention, in the aforementioned communication system, the storage means of the portable information terminal has an expiration date of the data table of the area stored in the storage means, the obtaining means of the portable information terminal is operative to judge whether or not the expiration date of the data table of the area is past, and the obtaining means of the portable information terminal is operative to obtain a data table of an area associated with the location detected by the location detecting means and the moving speed calculated by the moving speed calculating means through the network from the server when it is judged that the expiration date of the data table of the area is past.

The communication system thus constructed as previously mentioned makes it possible for the portable information terminal to obtain a data table of an area associated with the location and the moving speed from the server in the case that the expiration date of the data table of the area stored in the storage means is past.

In accordance with a sixteenth aspect of the present invention, in the aforementioned communication system, the storage means of the portable information terminal has an expiration date of the data table of the area stored in the storage means, the obtaining means of the portable information terminal is operative to judge whether or not the expiration date of the data table of the area is past, the obtaining means of the portable information terminal is operative to obtain a data table of an area associated with the location detected by the location detecting means, the moving speed calculated by the moving speed calculating means, and the date and the time managed by the date and time information managing means through the network from the server when it is judged that the expiration date of the data table of the area is past.

The communication system thus constructed as previously mentioned makes it possible for the portable information terminal to obtain a data table of an area associated with the location, the moving speed, and the date and the time from the server in the case that the expiration date of the data table of the area stored in the storage means is past.

BRIEF DESCRIPTION OF THE DRAWINGS

The features and advantages of a portable information terminal and communication system will be more clearly understood from the following description taken in conjunction with the accompanying drawings.

FIG. 4 is a block diagram showing an example of a data table associating each of the providing methods with a location and a moving speed, forming part of the providing pattern data stored in a storage unit of the first preferred embodiment of the portable information terminal according to the present invention.

BEST MODE OF CARRYING OUT THE PRESENT INVENTION

The preferred embodiments of the present invention will be described hereinafter with reference to the drawings.

Referring to FIGS. 1 through 7, there are shown a portable information terminal and a communication system according to the present invention.

The first embodiments of the portable information terminal and the communication system according to the present invention will be described first.

Figure 1:
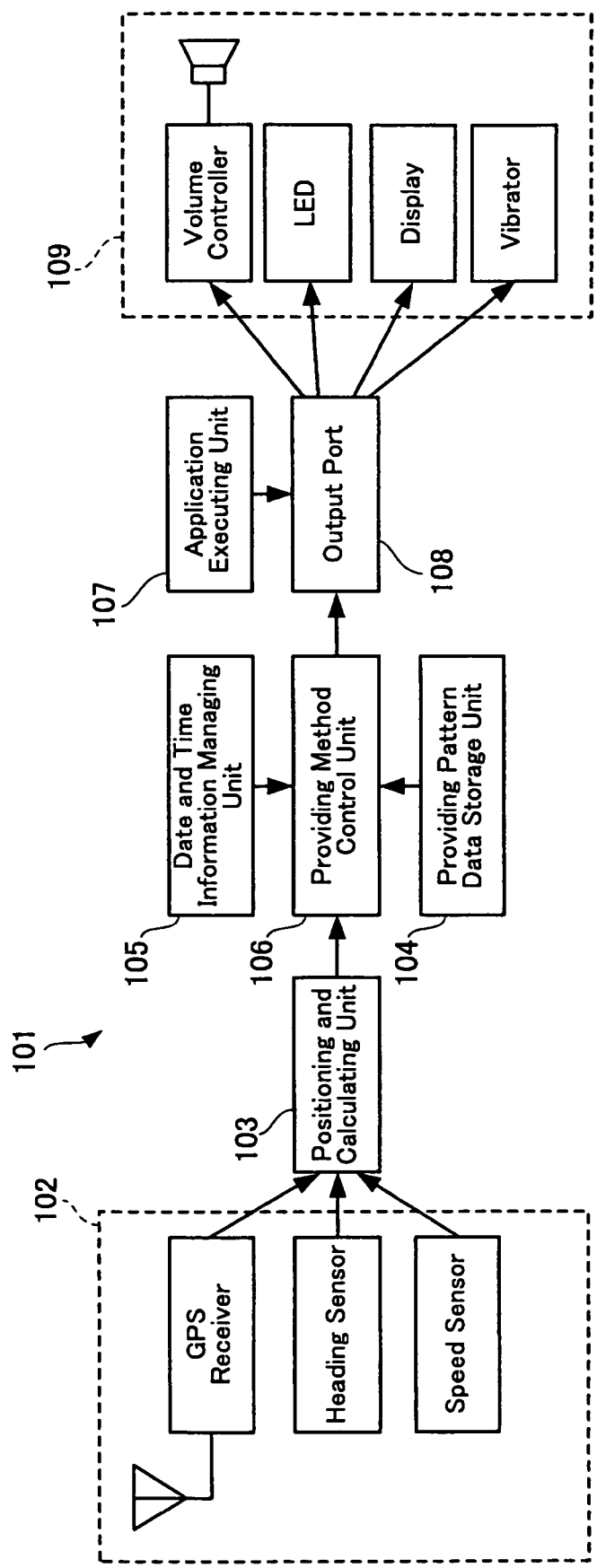
FIG. 1 is a block diagram showing a construction of a first preferred embodiment of the portable information terminal according to the present invention.

As shown in FIG. 1, the first embodiment of the portable information terminal 101 according to the present invention comprises an information providing unit 109 in advance set to an information providing method, hereinlater simply referred to as "providing method" selected from among a plurality of providing methods including an acoustic method having information provided by way of an acoustic message, a visual method having information provided by way of a visual message such as for example characters, graphics, luminescence, and the like, and a tactual method having information provided by way of vibration, to provide information in accordance with providing method; a providing pattern data storage unit 104 for storing therein a data table indicative of providing pattern data associating each of the providing methods with a moving speed at a plurality of locations, a sensor unit 102 for roughly detecting a current location and a moving speed, a positioning and calculating unit 103 for correcting the raw current location and the raw moving speed roughly detected by the sensor unit 102 to calculate a current location and a moving speed, a date and time information managing unit 105 for managing and obtaining date and time information indicative of a current date and a current time, an output port 108 in advance set to a providing method selected from among the plurality of providing methods, an application executing unit 107 for executing an application software and outputting the result of the execution of the application software to the output port 108, and a providing method control unit 106 for obtaining the providing method associated with the current location and the moving speed calculated by the positioning and calculating unit 103 from the providing pattern data storage unit 104 after comparing the current location and the moving speed with the providing pattern data stored in the providing pattern data storage unit 104 and controlling the output port 108 to have the output port 108 set to the providing method thus obtained by the providing method control unit 106. This means that the information providing unit 109 is operative to provide information, viz., the result of the execution of the application software executed by the application executing unit 107 in accordance with the providing method, to which the output port 108 is set.

The information providing unit 109 comprises a speaker, a volume controller, a light emitting diode, hereinafter simply referred to as "LED", a display, and a vibrator so as to provide the information in accordance with the acoustic method by way of an acoustic message, the visual method by way of a visual message such as for example characters, graphics, luminescence, or the like, or the tactual method by way of vibration.

The sensor unit 102 and the positioning and calculating unit 103 collectively constitute location detecting means and moving speed calculating means. The providing method control unit 106 constitutes obtaining means and providing method changing means. The providing pattern data storage unit 104, the date and time information managing unit 105, and the information providing unit 109 respectively constitute storage means, date and time information managing means, and information providing means. The sensor unit 102 comprises a global positioning system receiver, hereinlater simply referred to as "GPS" receiver, a heading sensor, and a speed sensor.

The GPS receiver is adapted to receive signals from a plurality of GPS satellites, measure propagation times necessary for the respective GPS signals to travel from the GPS satellites to the portable information terminal 101, and subsequently detect a current location on the basis of the locations of the GPS satellites and the propagation times. In addition, the GPS receiver may measure Doppler shift frequencies of the GPS signals, and calculate a moving speed of the portable information terminal 101 based on the Doppler shift frequencies of the GPS signals. Further, the speed sensor may count the number of wheel revolutions per reference time, and the heading sensor may include a geomagnetic direction sensor or a gyro sensor for outputting an angular velocity. The sensor unit 102 thus constructed enables the positioning and calculating unit 103 to calculate a current location and a moving speed on the basis of the number of wheel revolutions per reference time when the portable information terminal 101 is moving straight while, on the other hand, the sensor unit 102 thus constructed enables the positioning and calculating unit 103 to calculate a current location and a moving speed by integrating an angular velocity when the portable information terminal 101 is making a turn in the case that the portable information terminal 101 is located in a closed environment where the GPS signals cannot reach. Still further, the sensor unit 102 may detect a current location on the basis of, for example, radio signals or optical signals received from optical or radio beacons of the Vehicle Information and Communication System. Further the more, the sensor unit 102 may detect a location on the basis of signals received through a Local Area Network provided by for example, the Hot Spot Service by way of radio communication.

While it has been described in the present embodiment that the portable information terminal 101 comprises a speed sensor for detecting a moving speed for the purpose of changing the information providing method in response to the place and the environment where an operator carries and operates the portable information terminal, the portable information terminal according to the present invention may calculate an average moving speed, viz., the difference of locations per reference time on the basis of the locations detected at a predetermined time interval.

Though it has been described in the present embodiment that the portable information terminal 101 comprises a date and time information managing unit for managing date and time information indicative of a current date and a current time for the purpose of changing the information providing method in response to the place and the environment where an operator carries and operates the portable information terminal, the portable information terminal according to the present invention may obtain the date and time information using the GPS receiver.

Further, although it has been described in the present embodiment of the portable information terminal 101, the providing pattern data storage unit 104 is adapted to store therein a data table indicative of providing pattern data associating each of the providing methods with a moving speed at a plurality of locations, and the providing method control unit 106 is adapted to obtain the providing method associated with the current location and the moving speed calculated by the positioning and calculating unit 103 from the providing pattern data storage unit 104 for the purpose of changing the information providing method in response to the place and the environment where an operator carries and operates the portable information terminal, in the portable information terminal according to the present invention, the providing pattern data storage unit 104 may store therein a data table indicative of providing pattern data associating each of the providing methods with a location, a moving speed, and a date and a time, and the providing method control unit 106 may obtain the providing method associated with the current location and the moving speed calculated by the positioning and calculating unit 103 and the current date and time indicated by the date and time information managed by the date and time information managing unit 105 from the providing pattern data storage unit 104.

Figure 2:
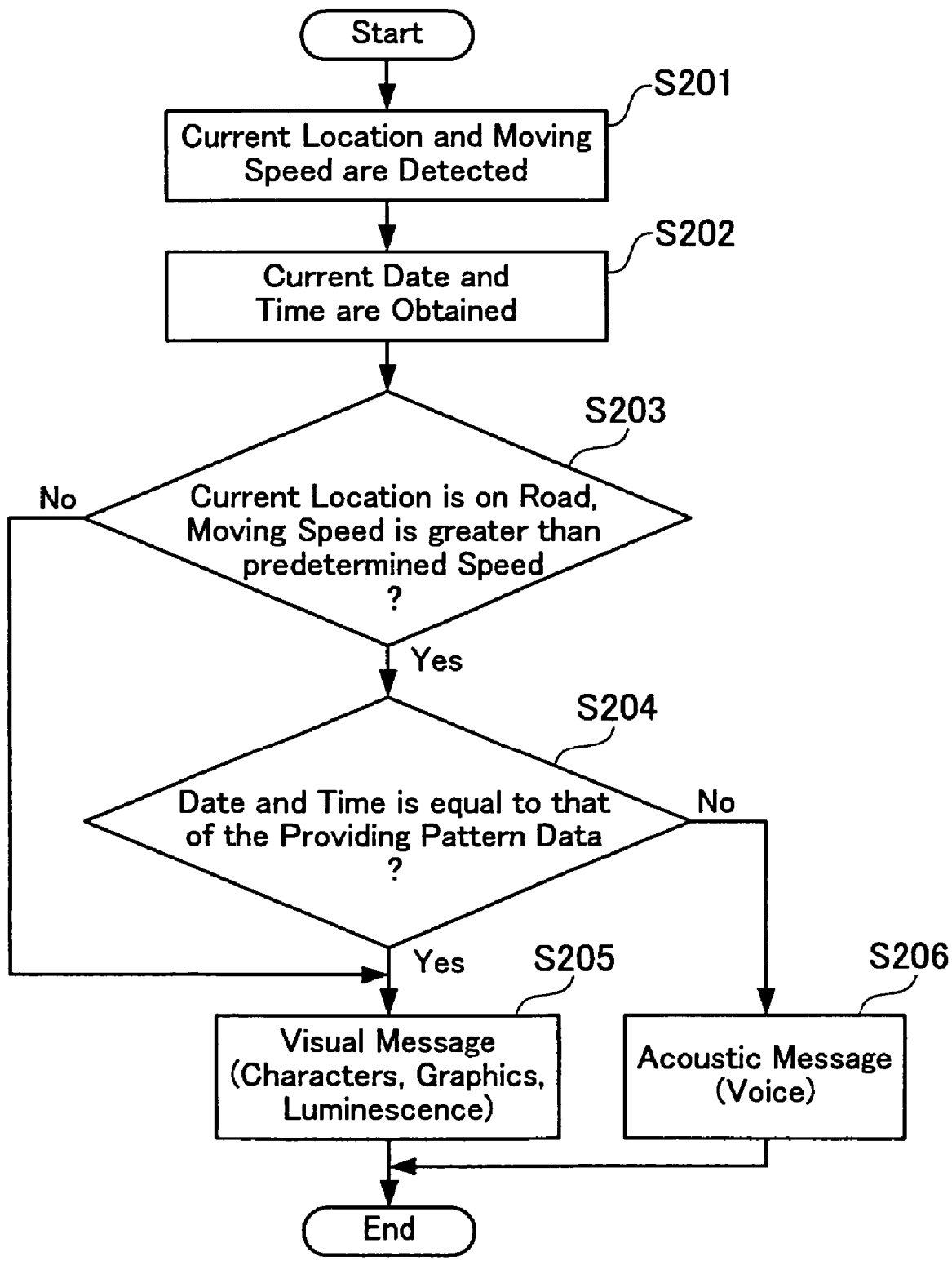
FIG. 2 is a flowchart showing an operation of the first preferred embodiment of the portable information terminal according to the present invention.

Secondly, the operation of the portable information terminal 101 according to the present invention will be described hereinlater with reference to FIG. 2.

The raw current location and the raw moving speed roughly detected by the sensor unit 102 is corrected, and the current location and the moving speed are calculated by the positioning and calculating unit 103 (step S201). The current date and the current time are obtained by the date and time information managing unit 105 (step S202). The providing pattern data associated with the current location and the moving speed calculated in the step S201 is obtained from the providing pattern data storage unit 104. At this time, the current location and the moving speed calculated by the positioning and calculating unit 103 is compared with the providing pattern data stored in the providing pattern data storage unit 104, and it is judged whether or not the location calculated by the positioning and calculating unit 103 is located within an area indicated by the providing pattern data stored in the providing pattern data storage unit 104, and whether or not the moving speed calculated by the positioning and calculating unit 103 is within a moving speed range indicated by the providing pattern data stored in the providing pattern data storage unit 104. When the result of the judgment is affirmative, the control goes to the step S204. When, on the other hand, the result of the judgment is negative, the control goes to the step S205 (step S203). It is further judged whether or not the date and time indicated by the date and time information obtained in the step S202 is equal to the date and time indicated by the date and time information contained in the providing pattern data stored in the providing pattern data storage unit 104 (step S204). When it is judged that the date and time is equal, the control goes forward to the step S205. When it is, on the other hand, judged that the date and time is not equal, the control goes forward to the step S206.

The output port 108 is set to the visual method, in accordance with which the information is provided by way of a visual message such as characters, graphics, luminescence, and/or the like, and the information is provided by way of, for example, characters, in accordance with the visual method, to which the output port 108 is set (step S205).

The output port 108 is, on the other hand, set to the acoustic method, in accordance with which the information is provided by way of, for example, an acoustic message, and the information is provided by way of, for example, voice, in accordance with the acoustic method to which the output port 108 is set (step S206).

In addition, in the portable information terminal 101 according to the present invention, the providing pattern data of stored in the providing pattern data storage unit 104 may include in advance upper speed limits and lower speed limits of the various moving speeds for the purpose of changing the information providing method in response to the place and the environment where an operator carries and operates the portable information terminal as will be described hereinlater. The portable information terminal 101 thus constructed can appropriately judge whether the operator carrying the portable information terminal 101 is moving on foot or by vehicle by comparing the moving speed calculated by the positioning and calculating unit 103 with the providing pattern data stored in the providing pattern data storage unit 104.

Further, the providing pattern data stored in the providing pattern data storage unit 104 may include in advance timetables of bus, train, and/or the like for the purpose of changing the information providing method in response to the place and the environment where an operator carries and operates the portable information terminal as will be described hereinlater. The portable information terminal 101 thus constructed can appropriately judge whether the operator carrying the portable information terminal 101 is moving by bus, train, or the like. When it is judged that the operator carrying the portable information terminal 101 is not moving by bus or train, it is well considered that the operator is driving a car, and the information provided by way of visual message such as characters could diminish operator's power of attention in driving. Accordingly, the portable information terminal 101 is operated to provide information by way of voice reading the character message in order to prevent the operator's attention from being diminished. When, on the other hand, it is judged that the operator carrying the portable information terminal 101 is moving by bus or train, the information provided by way of the acoustic message such as a ring alert or a voice message could disturb other passengers. Accordingly, the portable information terminal 101 is operated to provide information by way of visual message such as characters in order to prevent inconveniences from being caused to other passengers.

While it has been described in the present embodiment that the portable information terminal 101 is operative to change its information providing method from the visual method by way of displaying characters to acoustic method by way of a voice reading the characters, and vice versa, the portable information terminal according to the present invention may change its information providing method by altering the volume and/or tone of the voice, the color and/or the number of characters displayed, or the like.

The providing pattern data stored in the providing pattern data storage unit 104 will be described hereinlater with reference to FIG. 3.

Figure 3:
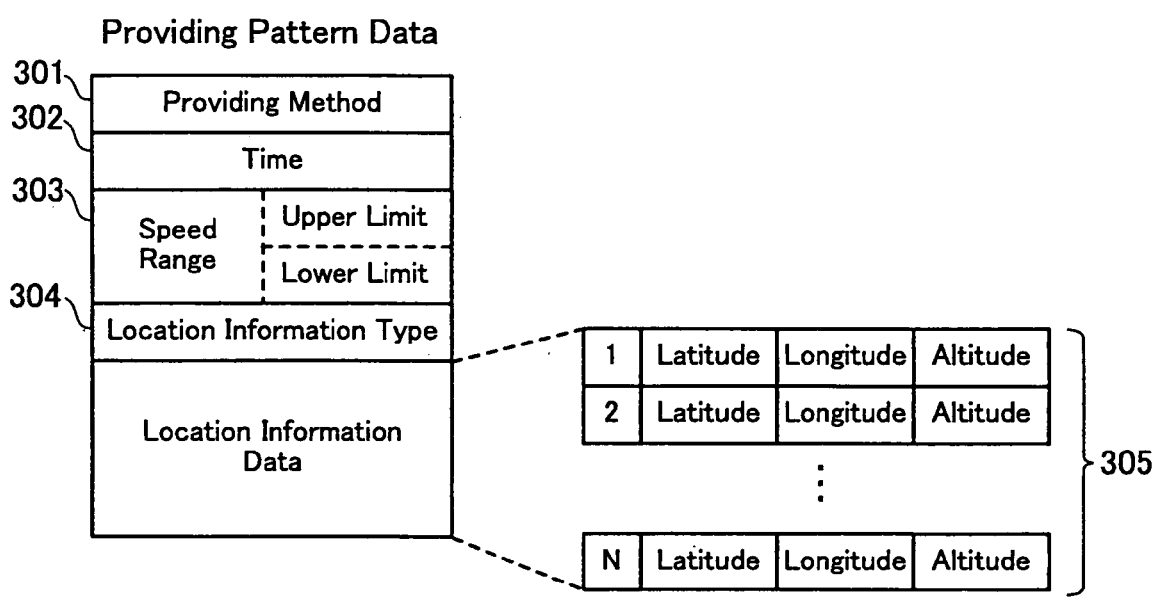
FIG. 3 is a block diagram showing a construction of providing pattern data stored in a storage unit of the first preferred embodiment of the portable information terminal according to the present invention.

The provided pattern data is as shown in FIG. 3 including a providing method field 301, a time field 302, a speed range field 303, a location information type field 304, and a location information data field 305.

The providing method field 301 forming part of the providing pattern data is set to a providing method selected from among a plurality of providing methods including an acoustic method by way of an acoustic message, a visual method by way of a visual message such as for example characters, graphics, luminescence, and/or the like, and a tactual method by way of vibration. The providing method field 301 is further set to a number indicative of a sound, a screen display, or a vibration to be provided by the information providing unit 109 in accordance with the providing method. Further, the providing method field 301 may include information on the volume of the sound, the number of characters, the number of vibrations, or the like depending on the providing method. The time field 302 is set to a number indicative of a day of the week, a date and a time, and the like when the providing pattern data is validated. The speed range field 303 is set to an upper speed limit and a lower speed limit collectively specifying a range in which the providing pattern data is validated. The location information type field 304 is set to a number indicative of a point, a line, or an area forming part of location information. The location information data field 305 is set to a plurality of pieces of location data respectively indicative of latitude, longitude, altitude, and the like corresponding to the data set to the location information type field 304.

As best shown in FIG. 4, the providing pattern data storage unit 104 includes a data table associating a location and a moving speed with at least one providing methods.

As will be seen from the foregoing description, it is to be understood that the present embodiment of the portable information terminal according to the present invention is operative to obtain providing pattern data corresponding to the location and the moving speed detected by the sensor unit and control the information providing unit to have the information providing unit set to the providing pattern data thus obtained, thereby making it possible for the portable information terminal to provide information in accordance with a providing method appropriate to a location and an environment where the portable information terminal is carried and operated.

Now, the second embodiments of the communication system according to the present invention will be described with reference to FIG. 5.

The second embodiment of the communication system 401 according to the present invention comprises a portable information terminal 402 and a providing pattern server 410 operable to communicate with the portable information terminal 402. The portable information terminal 402 is the same in construction as the first embodiment of the portable information terminal 101 except for the fact that the portable information terminal 402 further comprises a first communication control unit 403.

Figure 5:
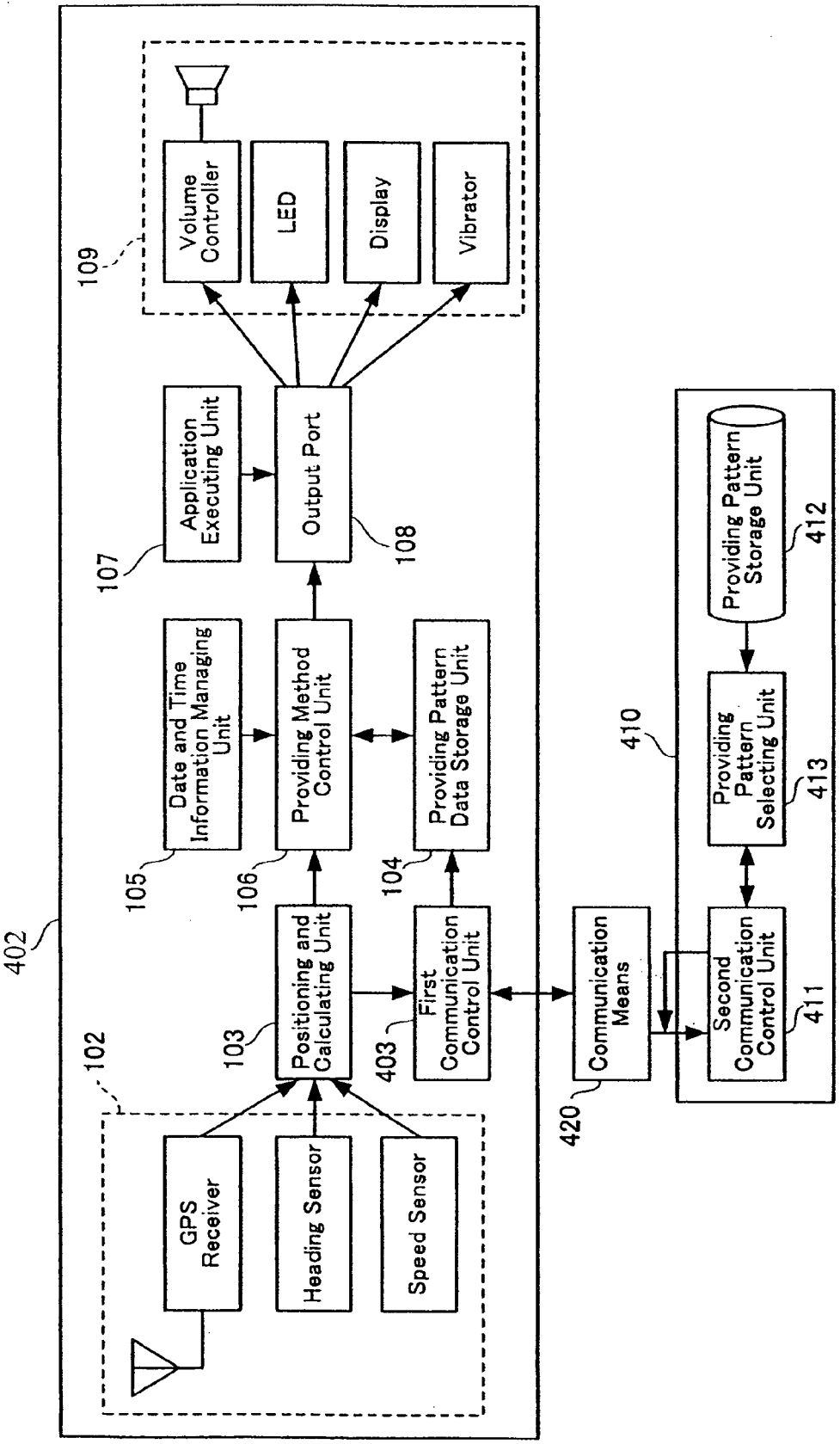
FIG. 5 is a block diagram showing a construction of a second preferred embodiment of the communication system according to the present invention.

The first communication control unit 403 of the portable information terminal 402 is adapted to control a communicating unit of the portable information terminal 402, not shown in FIG. 5, to have the portable information terminal 402 selectively connect with and disconnect from the providing pattern server 410 so that location information indicative of a current location calculated by the positioning and calculating unit 103 of the portable information terminal 402 is transmitted to the providing pattern server 410, and providing pattern data of an area corresponding to the current location indicated by the location information is received from the providing pattern server 410. The providing pattern data storage unit 104 is adapted to store therein the providing pattern data of the area thus received.

The providing pattern server 410 comprises a providing pattern storage unit 412 for managing and storing therein providing pattern data for a plurality of areas different from on another, a providing pattern selecting unit 413 for selecting providing pattern data for an area from among the providing pattern data of the plurality of areas managed stored by the providing pattern storage unit 412 in response to the location information, and a second communication control unit 411 for transmitting the providing pattern data of the selected area in response to the location information to the portable information terminal 402.

The providing pattern storage unit 412 and the second communication control unit 411 respectively constitute managing means and selecting mean according to the present invention.

The second communication control unit 411 is adapted to carry out an authorization process to judge whether or not to establish a connection between the providing pattern server 410 and the portable information terminal 402 in response to a connection request from the portable information terminal 402 on the basis of a password and operator information. The providing pattern storage unit 412 is constituted by a storage device such as for example a hard disk, a magnetic tape, a semiconductor memory or the like, and adapted to store therein a plurality of pieces of providing pattern data shown in FIG. 3 respectively corresponding to the plurality of areas. The portable information terminal 402 and the providing pattern server 410 are connected with each other through communication means 420. The communication means 420 is constituted by wireless communication means by way of for example a mobile cellular phone and a wireless Local Area Network and/or wire communication means by way of for example an Ethernet, a telephone line, and Universal Serial Bus.

Figure 6:
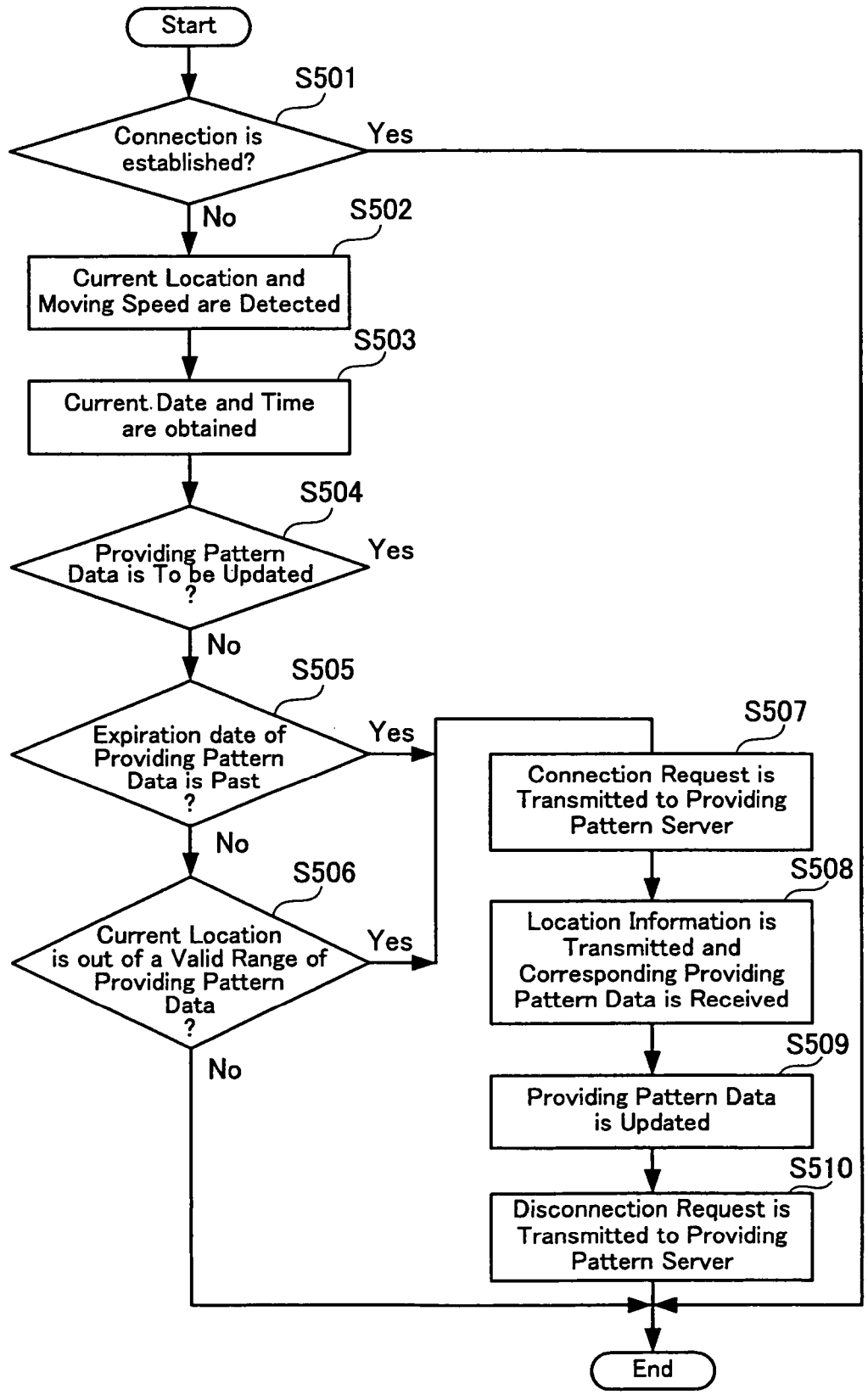
FIG. 6 is a flowchart showing an operation of the second preferred embodiment of the communication system according to the present invention.
Figure 7:
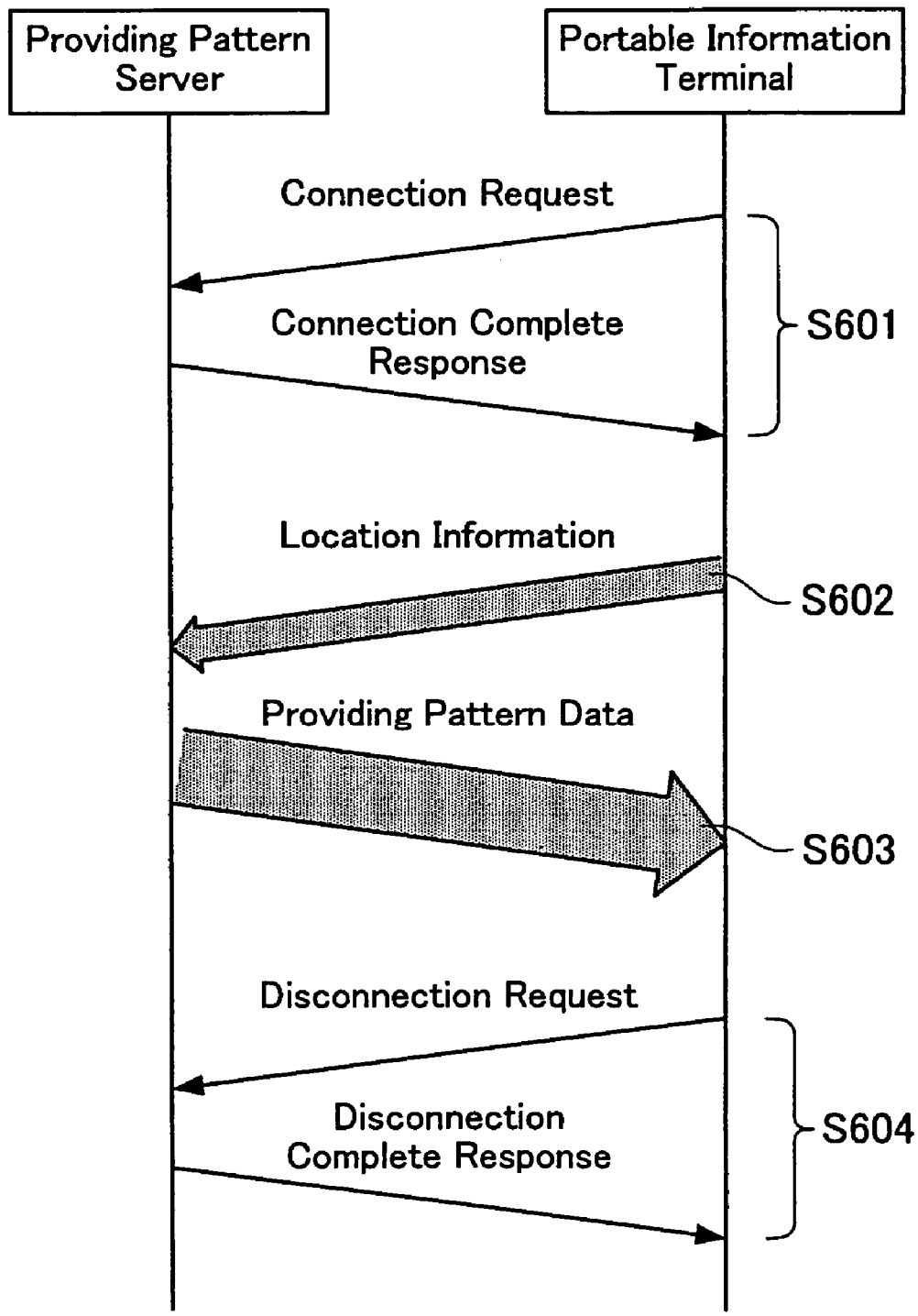
FIG. 7 is a flowchart showing a communication procedure of the second preferred embodiment of the communication system according to the present invention.
Figure 8:
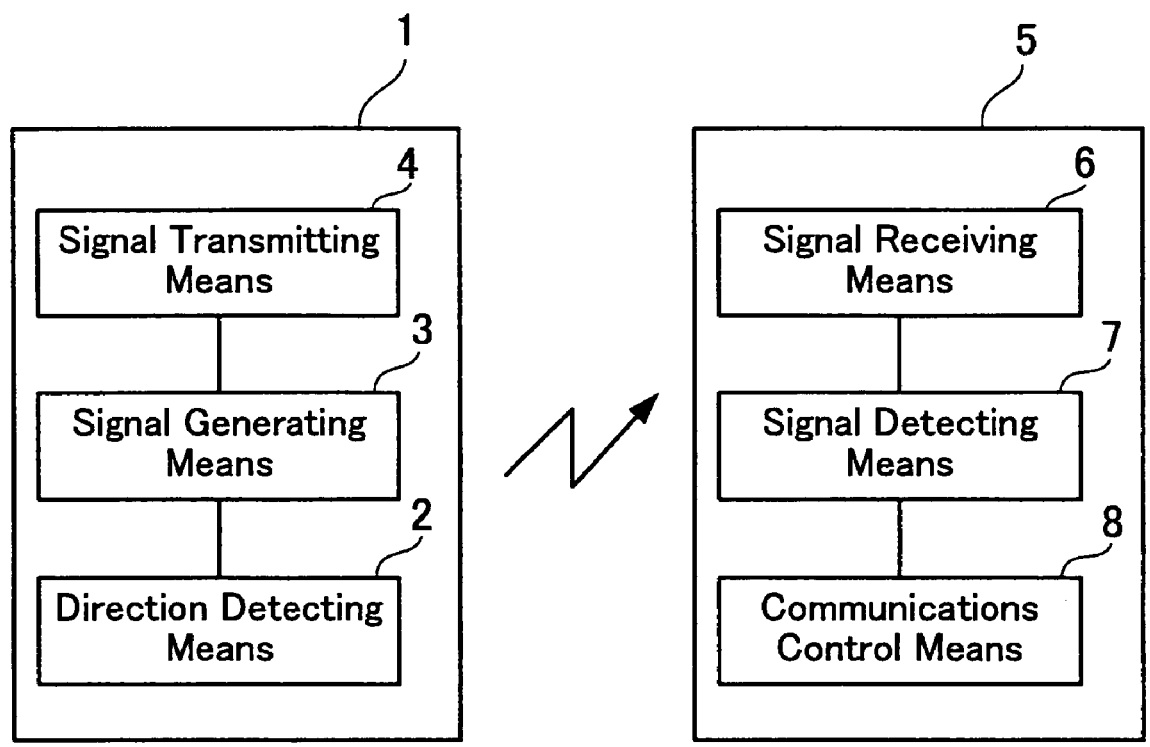
FIG. 8 is a block diagram showing a conventional communication system.

The operation of the communication system will be described hereinlater with reference to FIGS. 6 and 7.

It is judged whether or not the communication means 420 is available, i.e., whether or not the connection between the portable information terminal 402 and the providing pattern server 410 is established, in the step S501. When it is judged that the communication means 420 is available, the control goes forward to the step S502. When, on the other hand, it is judged that the communication means 420 is not available, the procedure is terminated. The current location and the moving speed are calculated by the positioning and calculating unit 103 (step S502). The current date and the current time are obtained by the date and time information managing unit 105 (step S503). It is judged whether or not providing pattern data is to be updated or not (step S504). When it is judged that the providing pattern data is to be updated, the control goes forward to the step S507. When it is, on the other hand, judged that the providing pattern data is not to be updated, the control goes forward to the step S505. It is then judged whether or not the expiration date of the providing pattern data is past (step S505). When it is judged that the expiration date of the providing pattern data is past, the control goes forward to the step S507. When, on the other hand, it is judged that the expiration date of the providing pattern data is not past, the control goes forward to the step S506. It is judged whether or not the current location calculated in the step S502 is out of a valid range of the providing pattern data stored in the providing pattern data storage unit 104 (step S506). When it is judged that the current location is not out of the valid range of the providing pattern data, the procedure is terminated. When it is, on the other hand, judged that the current location is out of the valid range of the providing pattern data, the control goes forward to the step S507. The first communication control unit 403 is operated to transmit a connection request to the second communication control unit 411. When the connection is authorized by the providing pattern server 410, the second communication control unit 411 is operated to transmit to the first communication control unit 403 a connection complete response indicating that the connection is authorized (step S507). The first communication control unit 403 is operated to transmit location information to the providing pattern server 410, and the providing pattern server 410 is operated to transmit providing pattern data of an area corresponding to a current location indicated by the location information to the first communication control unit 403 (step S508). The providing pattern data stored in the providing pattern data storage unit 104 is updated on the basis of the providing pattern data of the area thus received from the providing pattern server 410 (step S509). The first communication control unit 403 is then operated to transmit a disconnection request to the providing pattern server 410. The first communication control unit 403 is operated to receive a communication end response from the providing pattern server 410 to end the communication (step S510).

The communication procedure between the portable information terminal 402 and the providing pattern server 410 will be described hereinlater with reference to FIG. 7.

The portable information terminal 402 is operated to transmit a connection request to the providing pattern server 410 (step S601). In this step, the portable information terminal 402 is operated to transmit operator identification information and a password to the providing pattern server 410. When the connection is authorized by the providing pattern server 410, the providing pattern server 410 is operated to transmit to the portable information terminal 402 a connection complete response indicating that the connection is authorized (step S601). The portable information terminal 402 is operated to transmit to the providing pattern server 410 location information indicative of a current location (step S602). The providing pattern server 410 is operated to transmit providing pattern data of an area corresponding to the current location indicated by the location information to the portable information terminal 402 (step S603). When the providing pattern data is updated in the portable information terminal 402, the portable information terminal 402 is operated to transmit a disconnection request to the providing pattern server 410. The providing pattern server 410 is operated to transmit to the portable information terminal 402 a disconnection complete response indicating that the disconnection request is received to end the communication (step S604).

As will be seen from the foregoing description, it is to be understood that the present embodiment of the communication system according to the present invention, in which the providing pattern server is operative to manage providing pattern data for a plurality of areas different from on another, and transmit to the portable information terminal the providing pattern data of the area corresponding to the current position of the portable information terminal, and the portable information terminal is operative to obtain the providing pattern data from the providing pattern server, makes it possible for the portable information terminal to change its information providing method without being manually switched or turned off by the operator. Further, in the present embodiment of the communication system, the providing pattern server is operative to transmit the providing pattern data of an area corresponding to the current position of the portable information terminal, thereby making it possible for the portable information terminal to reduce its memory capacity.

INDUSTRIAL APPLICABILITY

As will be seen from the foregoing description, it is to be understood that the portable information terminal and the communication system according to the present invention have an advantageous effect of changing its information providing method in response to a location and an environment where the portable information terminal is carried and operated without being manually switched or turned off by the operator and are available as a portable information terminal and a communication system capable of changing its information providing method in response to a location and a moving speed thereof.

The invention claimed is:

1. A communication system comprising:
a portable information terminal, including:
information providing means operable to be set to a providing method in advance selected from among a plurality of providing methods including an acoustic method having said information provided by way of an acoustic message, a visual method having said information provided by way of a visual message, and a tactual method having said information provided by way of vibration, to provide information in accordance with said providing method set thereto;
storage means for storing therein a data table of a predetermined area associating each of said providing methods with a moving speed at a plurality of locations respectively located within said area;
location detecting means for detecting a location;
moving speed calculating means for calculating a moving speed at said location detected by said location detecting means;
obtaining means for judging whether or not said location detected by said location detecting means is located within said area and contained in said data table of said area, and obtaining said providing method associated with said location detected by said location detecting means and said moving speed calculated by said moving speed calculating means with reference to said data table of said area stored in said storage means;
providing method changing means for changing said providing method previously set to said information providing means to have said information provided in accordance with said providing method obtained by said obtaining means, and
first communication means for transmitting location information indicative of said location detected by said location detecting means through a network when it is judged by said obtaining means that said location detected by said location detecting means is not contained in said data table of said area, and a server including:
managing means for managing a plurality of data tables of a plurality of areas;
selecting means for selecting an data table of an area from among said plurality of data tables of said plurality of areas managed by said managing means in response to said location information transmitted by said first communication means; and
second communication means for transmitting said data table of said selected area in response to said location information to said portable information terminal, and
said first communication means being operative to receive said data table of said selected area from said server through said network, and
storage means being operative to modify said data table of said predetermined area stored therein in response to said data table of said selected are thus received.

2. A communication system as set forth in claim 1, in which
said portable information terminal further includes:
date and time information managing means for managing data and time information indicative of a current date and a current time,
said storage means of said portable information terminal having stored therein a data table associating each of said providing methods with a moving speed, and a date and a time at a plurality of locations, and
said obtaining means of said portable information terminal is operative to obtain said providing method associated with said location detected by said location detecting means, said moving speed calculated by said moving speed calculating means, and said date and said time managed by said date and time information managing means with reference to said data table stored in said storage means.

3. A communication system as set forth in claim 2, in which
said portable information terminal further includes timing means for obtaining a time at a predetermined time cycle, and
said obtaining means of said portable information terminal is operative to obtain said data table of said area corresponding to said location detected by said location detecting means, said moving speed calculated by said moving speed calculating means, and said date and said time managed by said date and time information managing means through said network from said server at said predetermined time cycle.

4. A communication system as set forth in claim 2, in which
said storage means of said portable information terminal has an expiration date of said data table of said area stored in said storage means,
said obtaining means of said portable information terminal is operative to judge whether or not said expiration date of said data table of said area is past, and
said obtaining means of said portable information terminal is operative to obtain a data table of an area associated with said located detected by said location detecting means, said moving speed calculated by said moving speed calculating means, and said date and said time managed by said date and time information managing means through said network from said server when it is judged that said expiration date of said data table of said area is past.

5. A communication system as set forth in claim 1, in which
said portable information terminal further includes timing means for obtaining a time at a predetermined time cycle, and said obtaining means of said portable information terminal is operative to obtain said data table of said area corresponding to said location detected by said location detecting means and said moving speed calculated by said moving speed calculating means through said network from said server at said predetermined time cycle.

6. A communication system as set forth in claim 1, in which said storage means of said portable information terminal has an expiration date of said data table of said area stored in said storage means, said obtaining means of said portable information terminal is operative to judge whether or not said expiration date of said data table of said area is past, and said obtaining means of said portable information terminal is operative to obtain a data table of an area associated with said location detected by said location detecting means and said moving speed calculated by said moving speed calculating means through said network from said server when it is judged that said expiration date of said data table of said area is past.

7. A communication system comprising:

a portable information terminal, including:

information providing means operable to be set to a providing method in advance selected from among a plurality of providing methods including an acoustic method having said information provided by way of an acoustic message, a visual method having said information provided by way of a visual message, and a tactual method having said information provided by way of vibration, to provide information in accordance with said providing method set thereto;

location detecting means for detecting a location;

moving speed calculating means for calculating a moving speed at said location detected by said location detecting means;

obtaining means for obtaining said providing method associated with said location detected by said location detecting means and said moving speed calculated by said moving speed calculating means through a network; and providing method changing means for changing said providing method previously set to said information providing means to have said information provided in accordance with said providing method obtained by said obtaining means, and a server having stored therein a data table associating each of said providing methods with a location and a moving speed, and said server being operative to obtain said providing method associated with said location detected by said location detecting means of said portable information terminal and said moving speed calculated by said moving speed calculating means of portable information terminal with reference to said data table stored therein, and transmit said providing method thus obtained to said portable information terminal through said network, said information providing means of said portable information terminal has an expiration date of said selected providing method, said obtaining means of said portable information terminal is operative to judge whether or not said expiration date of said selected providing method is past, and said obtaining means of said portable information terminal is operative to obtain said providing method associated with said location detected by said location detecting means and said moving speed calculated by said moving speed calculating means through said network from said server when it is judged that said expiration date of said selected providing method is past.

8. A communication system comprising:

a portable information terminal, including:

information providing means operable to be set to a providing method in advance selected from among a plurality of providing methods including an acoustic method having said information provided by way of an acoustic message, a visual method having said information provided by way of a visual message, and a tactual method having said information provided by way of vibration, to provide information in accordance with said providing method set thereto;

location detecting means for detecting a location;

moving speed calculating means for calculating a moving speed at said location detected by said location detecting means;

obtaining means for obtaining said providing method associated with said location detected by said location detecting means and said moving speed calculated by said moving speed calculating means through a network; and providing method changing means for changing said providing method previously set to said information providing means to have said information provided in accordance with said providing method obtained by said obtaining means, and a server having stored therein a data table associating each of said providing methods with a location and a moving speed, and said server being operative to obtain said providing method associated with said location detected by said location detecting means of said portable information terminal and said moving speed calculated by said moving speed calculating means of portable information terminal with reference to said data table stored therein, and transmit said providing method thus obtained to said portable information terminal through said network, said portable information terminal further includes:

date and time information managing means for managing date and time information indicative of a date and a time, and said server has stored therein a data table associating each of said providing methods with a location, a moving speed, and a date and a time, and said obtaining means of said portable information terminal is operative to obtain said providing method associated with said location detected by said location detecting means, said moving speed calculated by said moving speed calculating means, and said date and said time managed by said date and time information managing means through said network from said server, said information providing means of said portable information terminal has an expiration date of said selected providing method, said obtaining means of said portable information terminal is operative to judge whether or not said expiration date of said selected providing method is past, and said obtaining means of said portable information terminal is operative to obtain said providing method associated with said location detected by said location detecting means, said moving speed calculated by said moving speed calculating means, and said date and said time managed by said date and time information managing means through said network from said server when it is judged that said expiration date of said selected providing method is past.

\* \* \* \* \*